US012769918B2

(12) United States Patent
Li et al.

(10) Patent No.: US 12,769,918 B2
(45) Date of Patent: Oct. 20, 2026

(54) METHOD AND APPARATUS FOR ANALOG SIMULATION OF CIRCUIT MODEL, COMPUTER DEVICE, AND STORAGE MEDIUM

(71) Applicant: CHANGXIN MEMORY TECHNOLOGIES, INC., Hefei (CN)

(72) Inventors: Yu Li, Hefei (CN); Beiyou Zhao, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 1116 days.

(21) Appl. No.: 17/847,190

(22) Filed: Jun. 23, 2022

(65) Prior Publication Data

US 2023/0252213 A1 Aug. 10, 2023

Related U.S. Application Data

(63) Continuation of application No. PCT/CN2022/077694, filed on Feb. 24, 2022.

(30) Foreign Application Priority Data

Feb. 8, 2022 (CN) ......................... 202210118514.1

(51) Int. Cl.
*G06F 30/367* (2020.01)
*G06F 119/08* (2020.01)

(52) U.S. Cl.
CPC ........ *G06F 30/367* (2020.01); *G06F 2119/08* (2020.01)

(58) Field of Classification Search
CPC ........................... G06F 30/367; G06F 2119/08
See application file for complete search history.

(56) References Cited

U.S. PATENT DOCUMENTS

| | | | |
|---|---|---|---|
| 2017/0199089 A1 | 7/2017 | Fritchman et al. | |
| 2017/0219649 A1* | 8/2017 | Shan | G01R 31/2882 |

FOREIGN PATENT DOCUMENTS

| | | |
|---|---|---|
| CN | 1472882 A | 2/2004 |
| CN | 101334308 A | 12/2008 |

(Continued)

OTHER PUBLICATIONS

A. Kerber, T. Nigam, P. Paliwoda and F. Guarin, "Reliability Characterization of Ring Oscillator Circuits for Advanced CMOS Technologies," in IEEE Transactions on Device and Materials Reliability, vol. 20, No. 2, pp. 230-241, Jun. 2020 (Year: 2020).*

(Continued)

*Primary Examiner* — Bijan Mapar
(74) *Attorney, Agent, or Firm* — Intellectual Valley Law, P.C.

(57) ABSTRACT

Embodiments relate to a method and an apparatus for analog simulation of a circuit model. The method includes: obtaining a plurality of different environment variable values of the circuit model; obtaining delay time of each of the logic devices in the oscillator under the plurality of different environment variable values according to the plurality of environment variable values; inputting the delay time of each of the logic devices in the oscillator under the plurality of different environment variable values into the digital circuit model to perform a simulation test; obtaining frequencies of an output signal from the oscillator under the plurality of different environment variable values; and obtaining a relationship between the plurality of environment variable values and the frequencies of the output signal from the oscillator according to the frequencies of the output signal from the oscillator under the different environment variable values, to digitize the environment variable values.

16 Claims, 5 Drawing Sheets

(56) References Cited

FOREIGN PATENT DOCUMENTS

| | | | |
|---|---|---|---|
| CN | 101741352 | A | 6/2010 |
| CN | 105784154 | B | 2/2019 |
| CN | 109632117 | A | 4/2019 |
| CN | 110086429 | A | 8/2019 |

OTHER PUBLICATIONS

J. Nuñez et al., "Experimental Characterization of Time-Dependent Variability in Ring Oscillators," 2019 16th International Conference on Synthesis, Modeling, Analysis and Simulation Methods and Applications to Circuit Design (SMACD), Lausanne, Switzerland, 2019, pp. 229-232 (Year: 2019).*

Biabanifard, S., Largani, S. M. H., & Asadi, S. (2015). Delay time analysis of combined CMOS ring oscillator. International Journal of Electronics and Electrical Engineering, 4(2), 53-64. (Year: 2015).*

First Office Action in the Chinese Patent Application No. 202210118514.1, dated Jun. 11, 2026; English translation attached.

A. Timar, Temperature dependent timing in standard cell designs, Microelectronics Journal, vol. 45, pp. 521-529.

* cited by examiner

METHOD AND APPARATUS FOR ANALOG SIMULATION OF CIRCUIT MODEL, COMPUTER DEVICE, AND STORAGE MEDIUM

CROSS-REFERENCE TO RELATED APPLICATION

The present disclosure is a continuation of PCT/CN2022/077694, filed on Feb. 24, 2022, which claims priority to Chinese Patent Application No. 2022101185141 titled "METHOD AND APPARATUS FOR ANALOG SIMULATION OF CIRCUIT MODEL, COMPUTER DEVICE, AND STORAGE MEDIUM" and filed to the State Patent Intellectual Property Office on Feb. 8, 2022, the entire contents of which are incorporated herein by reference.

TECHNICAL FIELD

The present disclosure relates to the field of circuit simulation technology, and more particularly, to a method and an apparatus for analog simulation of a circuit model, a computer device, and a storage medium.

BACKGROUND

After design of a semiconductor chip circuit is completed, generally a simulation test is made to verify the circuit. In traditional simulation methods, generally environment variable (such as environment temperature) values of a chip circuit model are converted into analog signals (such as voltage signals and current signals) by means of simulation circuits. The analog signals are generally analyzed by means of analog simulation, which takes a long time.

In the related art, the analog signals are converted into digital signals for processing and digital simulation, and cycles can be shortened. However, for the digital simulation, there is only a distinction between a high level and a low level, that is, the distinction between 0 and 1. Therefore, when the analog signals obtained by the simulation circuits from different environment variable values are within the same level interval (high-level interval or low-level interval), after the analog signals are converted into the digital signals, they cannot be distinguished. Therefore, it is difficult to achieve accurate simulation analysis results by converting the analog signals into the digital signals for digital simulation.

SUMMARY

According to some embodiments of the present disclosure, there are provided a method and an apparatus for analog simulation of a circuit model, a computer device, and a storage medium.

According to some embodiments of the present disclosure, there is provided a method for analog simulation of a circuit model, wherein the circuit model includes a digital circuit model, the digital circuit model includes an oscillator, and the oscillator includes logic devices. The method includes: obtaining a plurality of different environment variable values of the circuit model; obtaining delay time of a relevant logic device in the oscillator under the plurality of different environment variable values according to the plurality of environment variable values; inputting the delay time of each of the logic devices in the oscillator under the plurality of different environment variable values into the digital circuit model to perform a simulation test; obtaining frequencies of an output signal from the oscillator under the plurality of different environment variable values; and obtaining a relationship between the plurality of environment variable values and the frequencies of the output signal from the oscillator according to the frequencies of the output signal from the oscillator under the plurality of different environment variable values, to digitize the plurality of environment variable values.

According to some embodiments, before obtaining delay time of each of the logic devices in the oscillator under the plurality of different environment variable values according to the plurality of environment variable values, the method also includes: obtaining a simulation relationship netlist of the relevant logic devices in the oscillator, wherein the simulation relationship netlist includes a plurality of environment variable values and a plurality of corresponding delay times.

According to some embodiments, the obtaining frequencies of an output signal from the oscillator under the plurality of different environment variable values includes: obtaining number of oscillations of the oscillator within a preset time period under the plurality of different environment variable values; and calculating the frequencies of the output signal from the oscillator under the plurality of different environment variable values according to the number of oscillations of the oscillator within the preset time period.

According to some embodiments, the plurality of environment variable values include an environment temperature, and after obtaining a relationship between the plurality of environment variable values and the frequencies of the output signal from the oscillator according to the frequencies of the output signal from the oscillator under the plurality of different environment variable values, the method also includes: establishing a digital simulation model according to the relationship between the environment temperature values and the frequencies of the oscillator.

According to some embodiments, the circuit model also includes a simulation circuit model, which includes a temperature sensor. After establishing the digital simulation model according to the relationship between the temperature values and the frequencies of the oscillator, the method also includes: obtaining a temperature value of the temperature sensor; and inputting the temperature value of the temperature sensor into the digital simulation model, such that the digital simulation model outputs a corresponding digital signal value.

According to some embodiments, after inputting the temperature value of the temperature sensor into the digital simulation model, such that the digital simulation model outputs a corresponding digital signal value, the method also includes: adjusting the temperature of the circuit model according to the corresponding digital signal value outputted by the digital simulation model.

According to some embodiments, the logic device includes at least one of an inverter, a NAND gate or a NOR gate.

According to some embodiments, the plurality of environment variables include a control voltage of the logic device.

According to some embodiments, the present disclosure also provides an apparatus for analog simulation of a circuit model, wherein the circuit model includes a digital circuit model, the digital circuit model includes an oscillator, and the oscillator includes logic devices. The apparatus includes: a first obtaining circuit configured to obtain a plurality of different environment variable values of the circuit model, and obtain delay time of a relevant logic device in the oscillator under the plurality of different environment variable values according to the plurality of environment variable values, and input the delay time of each of the logic devices in the oscillator under the plurality of different environment variable values into the digital circuit model to perform a simulation test; a detection circuit configured to obtain frequencies of an output signal from the oscillator under the plurality of different environment variable values; and an analysis circuit configured to obtain a relationship between the plurality of environment variable values and the frequencies of the output signal from the oscillator according to the frequencies of the output signal from the oscillator under the plurality of different environment variable values, to digitize the plurality of environment variable values.

According to some embodiments, the first obtaining circuit is also configured to obtain a simulation relationship netlist of the relevant logic devices in the oscillator, wherein the simulation relationship netlist includes a plurality of environment variable values and a plurality of corresponding delay times.

According to some embodiments, the detection circuit includes: a detection subcircuit configured to obtain number of oscillations of the oscillator within a preset time period; and a calculation subcircuit configured to calculate the frequencies of the oscillator according to the number of oscillations of the oscillator within the preset time period.

According to some embodiments, the plurality of environment variables include an environment temperature, and the apparatus also includes a model establishment circuit configured to establish a digital simulation model according to the relationship between the environment temperature values and the frequencies of the oscillator.

According to some embodiments, the circuit model also includes a simulation circuit model, which includes a temperature sensor. The apparatus also includes a second obtaining circuit configured to obtain a temperature value of the temperature sensor, and input the temperature value of the temperature sensor into the digital simulation model, such that the digital simulation model outputs a corresponding digital signal value.

According to some embodiments, the apparatus also includes an adjustment circuit configured to adjust the environment temperature of the circuit model according to the corresponding digital signal value outputted by the digital simulation model.

According to some embodiments, the present disclosure also provides a computer device including a memory and a processor. The memory stores a computer program, and the computer program is executable by the processor, whereby the steps of the method provided in any one of the foregoing embodiments are implemented.

According to some embodiments, the present disclosure also provides a computer-readable storage medium storing a computer program thereon, wherein the computer program is executable by a processor, whereby the steps of the method provided in any one of the foregoing embodiments are implemented.

The embodiments of the present disclosure may/at least have following advantages.

The delay times of the relevant logic devices in the oscillator may be affected by the plurality of environment variable values (such as the environment temperatures), and there is a correlational relationship between the delay times of the logic devices in the oscillator and the frequencies of the oscillator, and thus a numerical relationship between the plurality of environment variable values and the frequencies of the oscillator is obtained. Meanwhile, the frequency itself is a numeral, so the plurality of environment variable values may be converted into numerical value (that is, the plurality of environment variable values may be digitized). Therefore, based on the embodiments of the present disclosure, an analog simulation analysis may be performed on the plurality of environment variables by means of digital simulation, such that simulation time may be shortened, simulation efficiency may be improved, and accurate simulation analysis results may be obtained.

Details of one or more embodiments of the present disclosure are set forth in the following drawings and descriptions. Other features, objectives, and advantages of the present disclosure will become apparent from the description, the drawings, and the claims.

BRIEF DESCRIPTION OF THE DRAWINGS

To describe the technical solutions of the embodiments of the present disclosure more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

REFERENCE NUMERALS IN THE ACCOMPANYING DRAWINGS

100—first obtaining circuit, 200—detection circuit, 300—analysis circuit, 400—model establishment circuit, 500—second obtaining circuit, and 600—adjustment circuit.

To better describe and illustrate the embodiments and/or examples of those inventions disclosed herein, one or more drawings may be referred to. The additional details or examples intended for describing the drawings should not be considered as limiting the scope of any of the disclosed inventions, the currently described embodiments and/or examples, and best modes of these inventions currently understood.

DETAILED DESCRIPTION

For ease of understanding the present disclosure, the present disclosure will be described more fully hereinafter with reference to the accompanying drawings. Embodiments of the present disclosure are presented in the accompanying drawings. However, the present disclosure may be embodied in many different forms and should not be limited to the embodiments set forth herein. Rather, these embodiments are provided such that the present disclosure will be more thorough and complete.

Unless otherwise defined, all technical and scientific terms employed herein have the same meaning as commonly understood by one of ordinary skill in the art to which the present disclosure belongs. The terms employed in the specification of the present disclosure are merely for the purpose of describing some embodiments and are not intended for limiting the present disclosure.

It is to be understood that the terms "first", "second", etc. used in the present disclosure may be used herein to describe various elements, but these elements are not limited by these terms. These terms are only intended for distinguishing a first element from another one.

It is to be noted that when an element is referred to as being "connected to" another element, it may be directly connected to the other element or connected to the other element by means of intervening elements. In addition, the "connection" in the following embodiments should be understood as "electrical connection", "communication connection" and the like if there is transmission of electrical signals or data between objects to be connected.

As used herein, the singular forms of "a", "one" and "said/the" are also intended to include plural forms, unless the context clearly indicates otherwise. It should be also understood that the terms "comprise/include" or "having" and so on refer to the presence of stated features, integers, steps, operations, components, parts or combinations thereof, but do not preclude possibility of the presence or addition of one or more other features, integers, steps, operations, components, parts or combinations thereof. Meanwhile, the term "and/or" used in the specification includes any and all combinations of related listed items.

Figure 1:
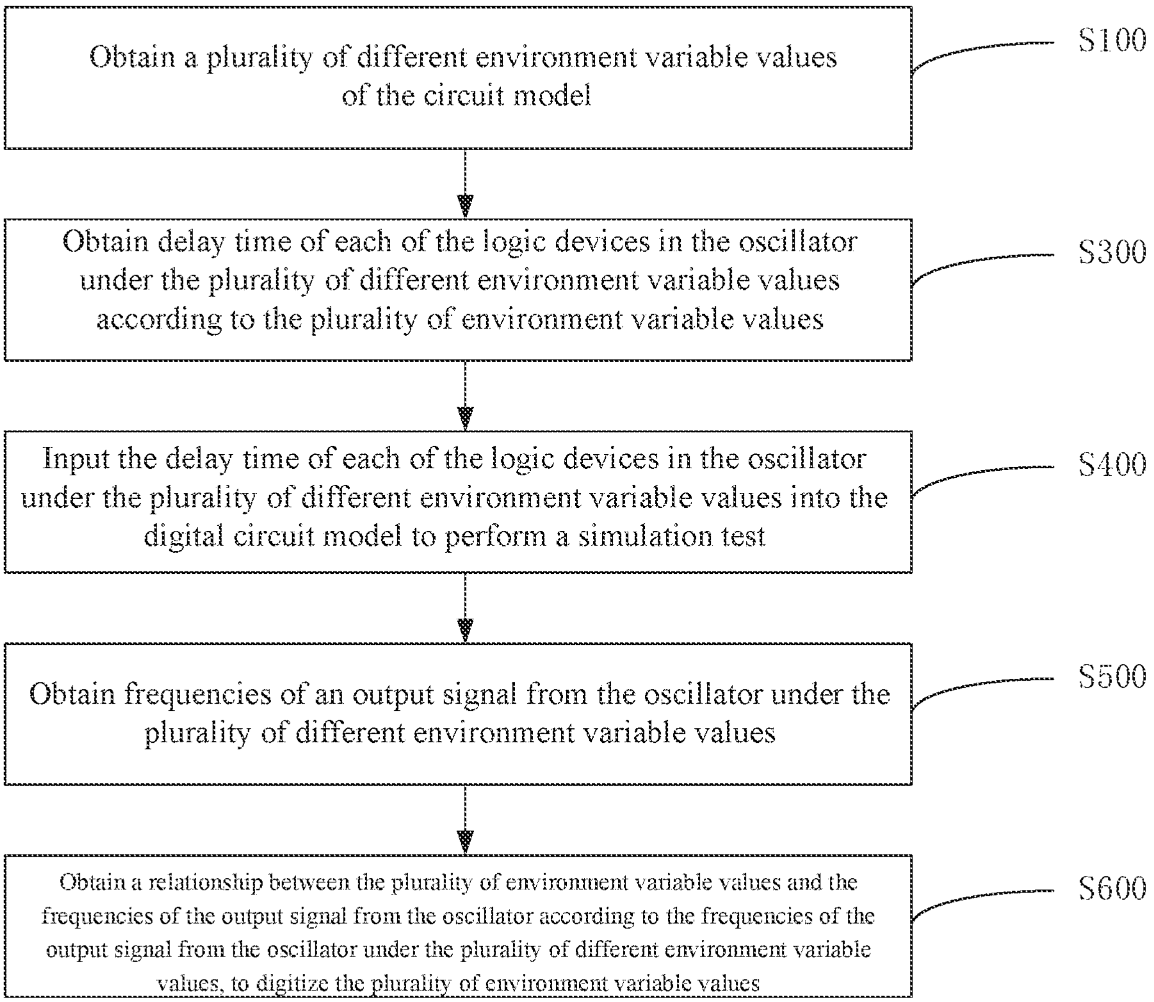
FIGS. 1 to 4 are schematic flow diagrams of a method for analog simulation of a circuit model according to different embodiments.
Figure 2:
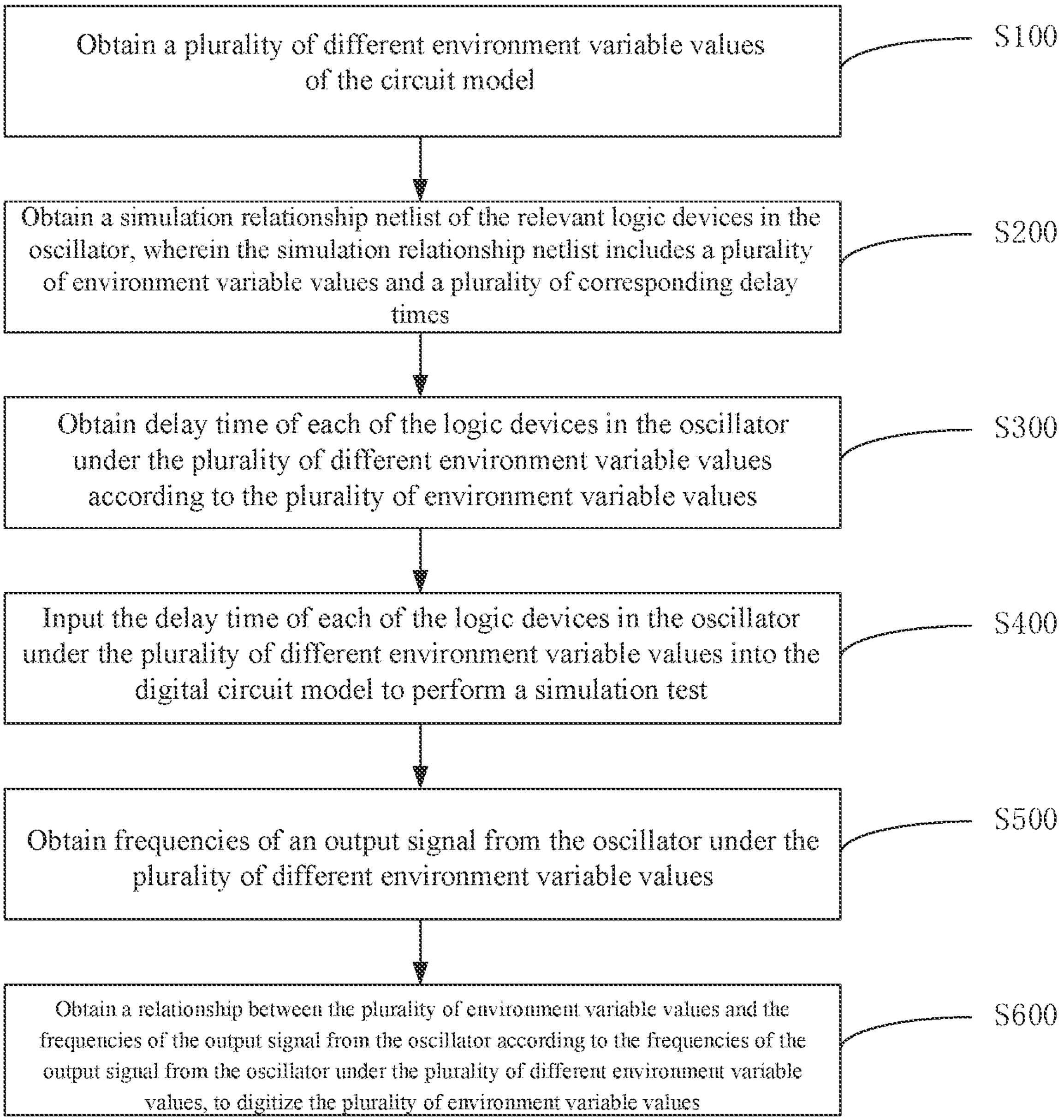
Figure 3:
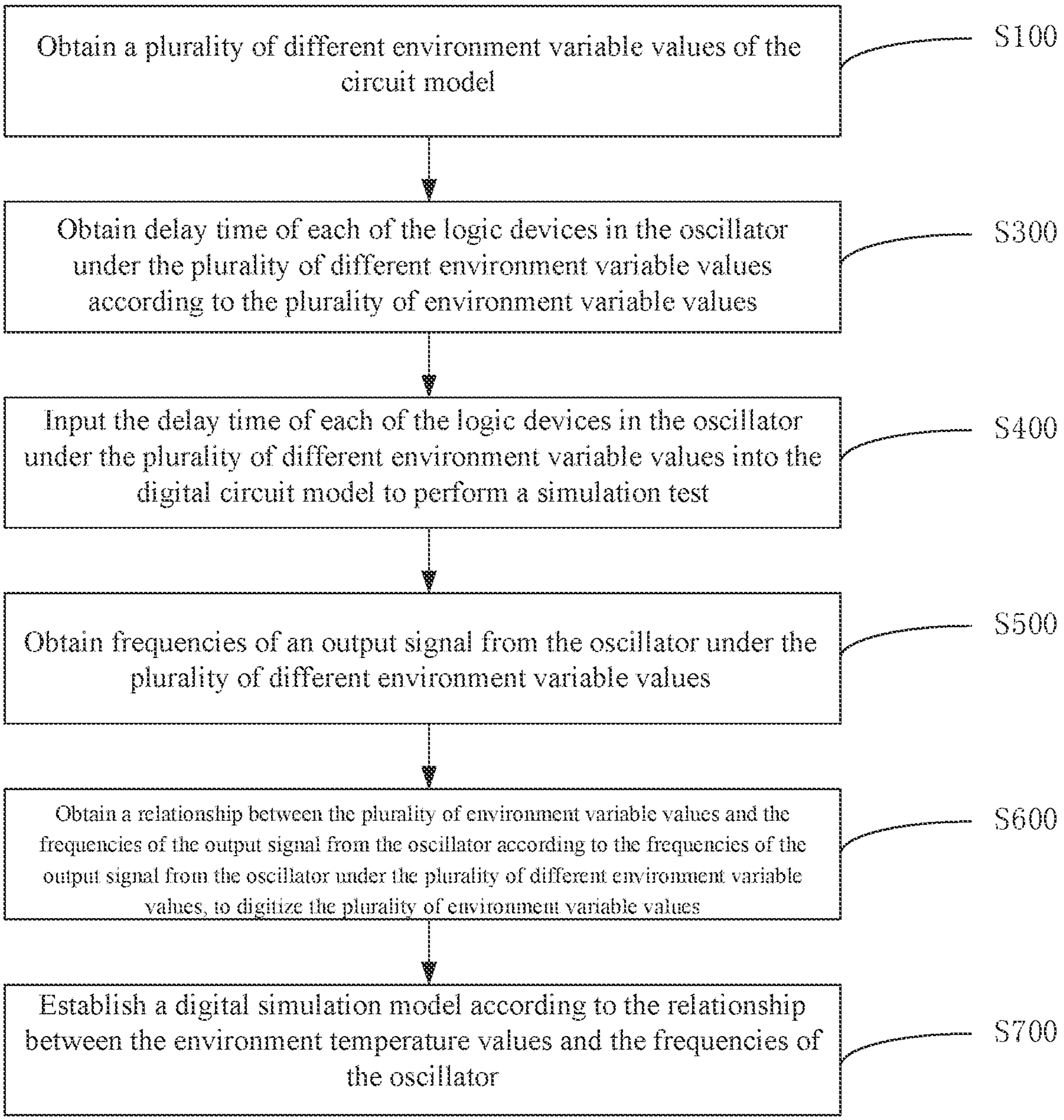
Figure 4:
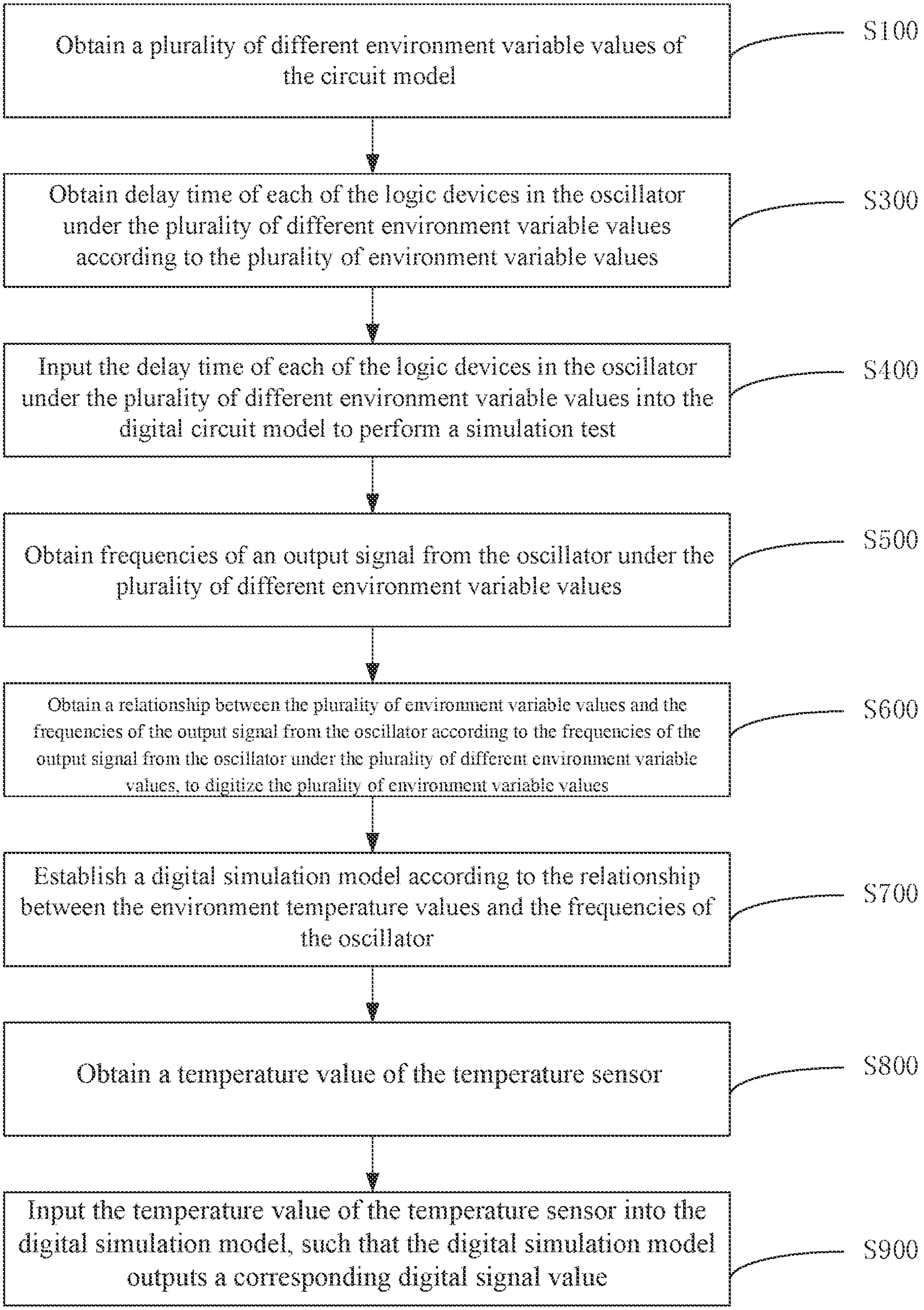
Figure 5:
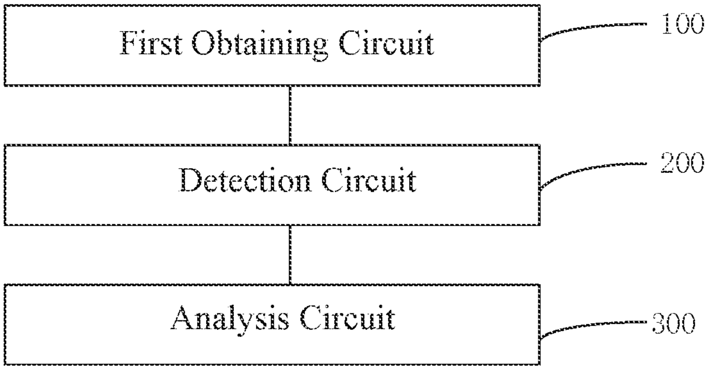
FIGS. 5 to 7 are structural block diagrams of an apparatus for analog simulation of a circuit model according to different embodiments.
Figure 6:
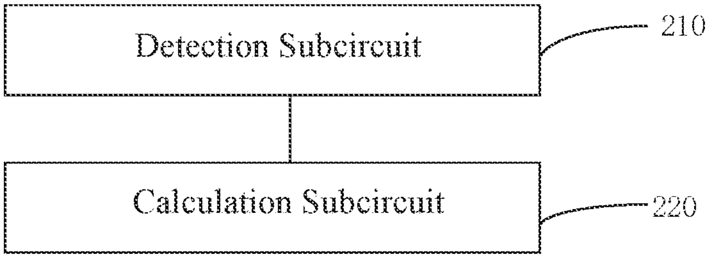
Figure 7:
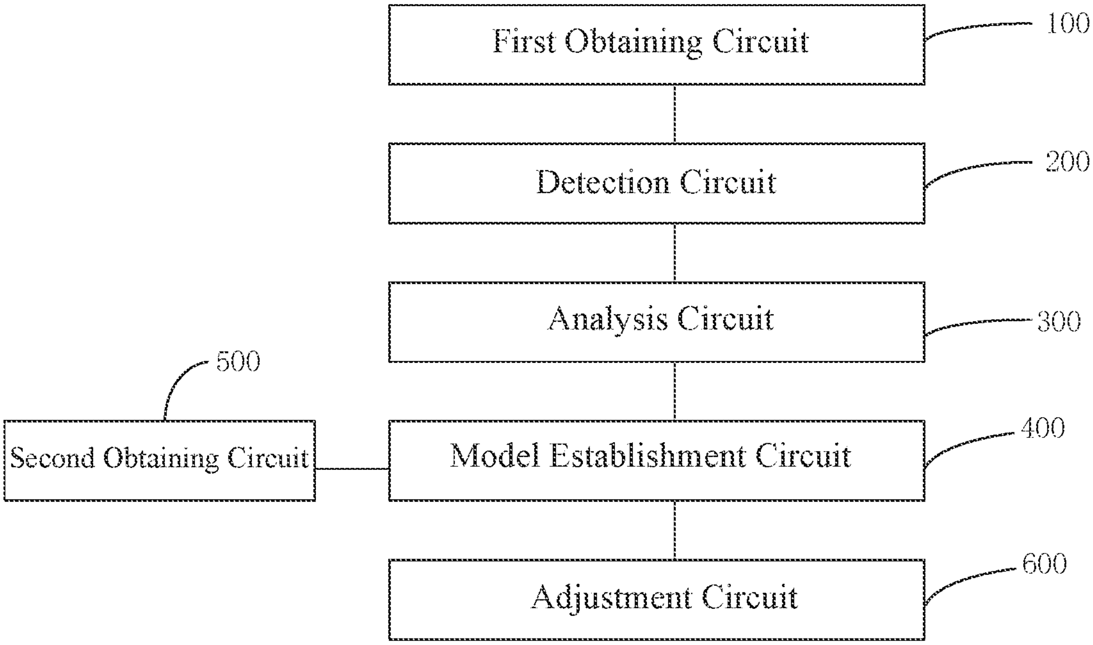

In one embodiment, as shown in FIG. 1, a method for analog simulation of a circuit model is provided. The circuit model may be, but is not limited to, a chip circuit model. In some embodiments, the circuit model includes a digital circuit model. The digital circuit model includes an oscillator. The oscillator includes logic devices.

The method for analog simulation of a circuit model include following steps.

Step S100: obtaining a plurality of different environment variable values of the circuit model;

Step S300: obtaining delay time of each of the logic devices in the oscillator under the plurality of different environment variable values according to the plurality of environment variable values;

Step S400: inputting the delay time of each of the logic devices in the oscillator under the plurality of different environment variable values into the digital circuit model to perform a simulation test;

Step S500: obtaining frequencies of an output signal from the oscillator under the plurality of different environment variable values; and Step S600: obtaining a relationship between the plurality of environment variable values and the frequencies of the output signal from the oscillator according to the frequencies of the output signal from the oscillator under the plurality of different environment variable values, to digitize the plurality of environment variable values.

In the Step S100, the "environment variable" is a variable-valued environment factor that affects performance of the circuit model.

In the Step S300, in some embodiments, at least one logic device is provided in the oscillator. There is at least one type of logic devices in the oscillator.

As an example, the logic devices in the oscillator may include at least one of an inverter, a NAND gate or a NOR gate.

Each of the logic devices in the oscillator has a delay time that affects the frequencies of the oscillator. The frequencies of the oscillator are related to the delay time of the logic devices in the oscillator.

For each of the logic devices, the delay time may be affected by factors such as temperature, control voltage, and processing technology. For each of the logic devices, when one of the factors therein is used as a variable and the other factors are fixed, the delay time varies with this variable value.

The environment variables of the circuit model may have an effect on the delay time of each of the logic devices, or may have an effect on the delay time of one or some of the logic devices. Therefore, there is at least one relevant logic device in the oscillator.

When there are a plurality of relevant logic devices (logic devices affected by the plurality of environment variables of the circuit model) in the circuit model and various types of logic devices are involved, the delay times of the same type of logic devices (for example, the inverter) and the plurality of environment variable values have the same relationship, but the delay times of different types of logic devices and the plurality of environment variable values may have different relationships. In some embodiments, for the same logic device, one environment variable value corresponds to the same delay time; and for different logic devices, one environment variable value may correspond to different delay times.

Therefore, the delay time of each of the relevant logic devices in the oscillator may be obtained according to the plurality of environment variable values of the circuit model. In some embodiments, the corresponding delay time of each of the logic devices in the oscillator may be obtained according to the plurality of environment variable values obtained in the Step S100.

In the Step S400, the delay times of all the logic devices in the oscillator under the plurality of environment variable values are inputted into the digital circuit model. It is to be understood that when the plurality of environment variables of the circuit model have an effect on the delay time of one or some of the logic devices, before the Step S400, the step of obtaining the delay times of other logic devices is also included.

When performing the simulation test, under the same environment variable value, when the delay time of each of the logic devices in the oscillator is inputted into the digital circuit model, the oscillator may output a signal according to a corresponding frequency.

When the delay time (obtained by the Step S300) of each of the logic devices in the oscillator is inputted into the digital circuit model, the oscillator may output corresponding signals according to different frequencies.

In the Step S500, the frequencies of the output signal from the oscillator are obtained under the plurality of different environment variable values. That is, the frequencies of the output signal from the oscillator under the plurality of different environment variable values obtained in the Step S100 are obtained.

In the Step S600, data fitting may be performed on the plurality of environment variable values and the frequencies of the output signal from the oscillator to obtain the relationship between the plurality of environment variable values and the frequencies of the output signal from the oscillator. Because the frequency itself is a numeral, the plurality of environment variable values may be digitized by obtaining the relationship between the plurality of environment variable values and the frequencies of the output signal from the oscillator.

In the simulation method of this embodiment, the delay times of the relevant logic devices in the oscillator may be affected by the plurality of environment variable values (such as the environment temperatures), and there is a correlational relationship between the delay times of the logic devices in the oscillator and the frequencies of the oscillator, and thus a numerical relationship between the plurality of environment variable values and the frequencies of the oscillator is obtained. Meanwhile, the frequency itself is a numeral, so the plurality of environment variable values may be converted into numerical value (that is, the plurality of environment variable values may be digitized). Therefore, based on the method of this embodiment, an analog simulation analysis may be subsequently performed on the plurality of environment variables by means of digital simulation, such that simulation time may be shortened, simulation efficiency may be improved, and accurate simulation analysis results may be obtained.

In one embodiment, before the Step S300, the method also includes following steps.

Step S200: obtaining a simulation relationship netlist of the relevant logic devices in the oscillator, wherein the simulation relationship netlist includes a plurality of environment variable values and a plurality of corresponding delay times.

In some embodiments, the oscillator may be provided with one or more relevant logic devices affected by the environment variables. When the oscillator is provided with various relevant logic devices whose delay times are affected by the environment variables, the simulation relationship netlist of the various relevant logic devices may have a plurality of the same environment variable values.

In the simulation relationship netlist of each type of relevant logic devices, each of the plurality of environment variable values corresponds to one delay time; and when the plurality of environment variable values remain unchanged, the delay times of different types of relevant logic devices may be different.

The plurality of environment variable values and the corresponding delay times in the simulation relationship netlist of various relevant logic devices may be obtained by obtaining historical test data according to relevant test data of the circuit model or an actual circuit corresponding to the circuit model.

It is to be understood that at this moment, the environment variable values in the Step S100 may be a plurality of environment variable values selected from the plurality of environment variable values in the simulation relationship netlist inputted externally, or may also be the plurality of environment variable values obtained from the simulation relationship netlist. This is not limited herein.

In this embodiment, by first obtaining the simulation relationship netlist of various relevant logic devices in the oscillator, the delay time of each of the relevant logic devices in the oscillator may be obtained easily and quickly according to the plurality of environment variable values of the circuit model and the simulation relationship netlist of various relevant logic devices.

Of course, in some embodiments, the simulation relationship netlist also may not be obtained. In this case, the plurality of environment variable values obtained in the Step S100 may be a plurality of environment variable values inputted externally according to requirements. Next, in the Step S300, the delay time of each of the relevant logic devices in the oscillator may be calculated according to the plurality of environment variable values and the relationship between the plurality of environment variable values and the delay times of the relevant logic devices.

In one embodiment, the Step S500 includes:

Step S510: obtaining number of oscillations of the oscillator within a preset time period under the plurality of different environment variable values; and Step S520: calculating the frequencies of the output signal from the oscillator under the plurality of different environment variable values according to the number of oscillations of the oscillator within the preset time period.

In step S510, "under the plurality of different environment variable values" means the plurality of different environment variable values obtained in the Step S100. The preset time period may be set according to actual needs.

For each of the plurality of environment variable values, the delay time of one corresponding logic device may be obtained and inputted into the digital circuit model to perform a simulation test, to obtain an output signal waveform of the oscillator. Next, the number of oscillations of the oscillator within the preset time period may be obtained according to the output signal waveform of the oscillator within the preset time period.

In the Step S520, the preset time period is set to t seconds, and under a certain one of the plurality of environment variable values, the number of oscillations of the oscillator within the preset time period of t seconds is n. In this case, the frequency of the output signal from the oscillator under this environment variable value is $f=n/t$.

Each of the plurality of environment variable values is performed in the same way, such that the frequencies of the output signal from the oscillator under the plurality of different environment variable values may be obtained.

In this embodiment, the frequencies of the output signal from the oscillator may be obtained more accurately by means of a plurality of oscillations of the oscillator within the preset time period.

Of course, the manner of obtaining the frequencies of the output signal from the oscillator under the plurality of different environment variable values in the Step S500 is not limited thereto. For example, in some embodiments, it is also advisable to first obtain oscillation time required for a preset number of oscillations of the oscillator under the plurality of different environment variable values, and then the frequencies of the output signal from the oscillator under the plurality of different environment variable values are calculated according to the oscillation time required for the preset number of oscillations. The preset number of oscillations may be set according to actual needs. In some embodiments, the preset number of oscillations may be more (i.e., more than one) or one, which is not limited here.

In one embodiment, the plurality of environment variables include environment temperature.

In this case, the environment temperature may be used as a variable, and other environment factors (such as control voltage and processing technology) are fixed.

After the Step S600, the method also includes:

Step S700: establishing a digital simulation model according to the relationship between the environment temperature values and the frequencies of the oscillator.

In this embodiment, after the digital simulation model is established, the environment temperature may be quickly and accurately converted, as a simulation object, into a digital signal, such that a rapid and accurate digital simulation analysis may be performed on this simulation object subsequently.

In one embodiment, the circuit model also includes a simulation circuit model. In this case, the circuit model is a circuit model of a digital-analog hybrid circuit. Meanwhile, the simulation circuit model includes a temperature sensor, which can detect the environment temperature of the circuit model.

After the Step S700, the method also includes:

Step S800: obtaining a temperature value of the temperature sensor; and

Step S900: inputting the temperature value of the temperature sensor into the digital simulation model, such that the digital simulation model outputs a corresponding digital signal value.

In the Step S800, the temperature value of the temperature sensor is the environment temperature value of the circuit model detected by the temperature sensor.

In the Step S900, the digital simulation model is the digital simulation model obtained in the Step S700 where the environment temperature serves as the simulation object. After the temperature value of the temperature sensor is inputted into the digital simulation model, the corresponding digital signal value may be obtained quickly and accurately.

As an example, in some embodiments, the method for analog simulation of a circuit model in this embodiment may be used for a full-chip simulation test.

In a semiconductor chip circuit, the entire circuit has both a simulation circuit and a digital circuit. Generally, the digital circuit has a large scale, and simple full-chip analog simulation consumes a lot of time, which has a seriously negative effect on project processes. If the environment temperature is detected by the temperature sensor, then the detected environment temperature value is converted into an analog signal such as voltage or current by a simulation circuit, next the analog signal is converted into a digital code by an analog-to-digital conversion circuit, and then the digital code is processed a digital circuit, the simulation cycle is short. However, in this case, analog voltage and analog current are generally converted into digital voltage and digital current, and the converted digital signal only has a distinction between a high level and a low level, so it is difficult to achieve accurate simulation analysis of the environment temperature.

However, in this embodiment, it is no longer required to convert, by means of the simulation circuit, the environment temperature value detected by the temperature sensor into an analog signal, and then convert the analog signal into a digital signal by means of an analog-to-digital conversion circuit. In this embodiment, the plurality of environment temperature values are directly converted into accurate digital signals based on the relationship between the plurality of environment temperature values detected by the temperature sensor and the frequencies of the output signal from the oscillator, such that an accurate simulation analysis of the environment temperature may be achieved. Therefore, this embodiment can speed up simulation verification processes of a chip, improve efficiency, and reduce project time.

In one embodiment, after the Step S900, the method also includes:

Step S1000: adjusting the temperature of the circuit model according to the corresponding digital signal value outputted by the digital simulation model.

In some embodiments, when an environment variable is the environment temperature, the environment variable is a controllable environment variable. In this case, a corresponding temperature adjustment circuit may be provided to adjust the environment temperature of the circuit model. In some embodiments, the temperature adjustment circuit may have functions such as heating and/or cooling the circuit model.

After the adjustment of the temperature adjustment circuit, the temperature sensor may measure the environment temperature of the circuit model again, and then input a measurement result into the digital simulation model to obtain a digital signal value corresponding to the adjusted environment temperature value.

In this embodiment, a plurality of environment temperature values may be obtained, and the plurality of environment temperature values are converted into corresponding digital signal values, to facilitate further analysis of the circuit model accordingly. After further analysis, it may be obtained under what environment temperature the circuit model can meet product performance requirements, etc.

In one embodiment, the plurality of environment variables include control voltages of the logic devices. In this case, the plurality of environment variables may only have an effect on the delay times of the logic devices controlled by the control voltages.

In some embodiments, types of control voltages may vary depending on types of the logic devices. For example, the control voltage of the inverter may include a pull-up voltage and a pull-down voltage. However, the control voltages of some of the logic devices may only have the pull-up voltage or the pull-down voltage, such as a capacitor configured to control a single-edge delay in a single-edge delay circuit.

In this embodiment, the relationship between the control voltages of the logic devices and the frequencies may be obtained, such that accurate numerical values of the voltages of the logic devices may be obtained, thereby facilitating the adjustment of the control voltages of the logic devices.

In addition, when the plurality of environment variables are the control voltages of the logic devices, etc., the method for analog simulation of a circuit model may also include some similar method steps when the plurality of environment variables are environment temperatures. For example, another digital simulation model may be established according to the relationship between the control voltages and the frequencies of the oscillator. Next, a plurality of control voltages may be inputted into the digital simulation model to obtain a plurality of corresponding digital signal values, which may facilitate the digital simulation analysis of the control voltages of the logic devices.

It is to be understood that although the various steps in the flowcharts of FIGS. 1 to 4 are displayed in sequence as indicated by the arrows, these steps are not necessarily performed in sequence in the order indicated by the arrows. It is to be understood that unless expressly stated herein, the execution of these steps is not strictly limited in sequence, and these steps may be performed in other orders. Moreover, at least some of the steps in FIGS. 1 to 4 may include a plurality of steps or a plurality of phases, which are not necessarily executed at the same moment, but may be executed at different moments, and the order of execution of these steps or phases is not necessarily performed sequentially, but may be executed alternately or alternately with other steps or at least a portion of steps or phases in the other steps.

In one embodiment, an apparatus for analog simulation of a circuit model is provided. The circuit model includes a digital circuit model, and the digital circuit model includes an oscillator, which includes logic devices.

The apparatus for analog simulation of a circuit model includes a first obtaining circuit 100, a detection circuit 200, and an analysis circuit 300.

The first obtaining circuit 100 is configured to obtain a plurality of different environment variable values of the circuit model, and obtain delay time of relevant logic devices in the oscillator under the plurality of different environment variable values according to the plurality of environment variable values, and input the delay time of each of the logic devices in the oscillator under the plurality of different environment variable values into the digital circuit model to perform a simulation test.

The detection circuit 200 is configured to obtain frequencies of an output signal from the oscillator in the digital circuit model under the plurality of different environment variable values.

The analysis circuit 300 is configured to obtain a relationship between the plurality of environment variable values and the frequencies of the output signal from the oscillator according to the frequencies of the output signal from the oscillator under the plurality of different environment variable values, to digitize the plurality of environment variable values.

In one embodiment, the first obtaining circuit 100 is also configured to obtain a simulation relationship netlist of the relevant logic devices in the oscillator. The simulation relationship netlist includes a plurality of environment variable values and a plurality of corresponding delay times.

At this moment, the first obtaining circuit 100 may include a first obtaining subcircuit, a second obtaining subcircuit, and a third obtaining subcircuit. The first obtaining subcircuit may be configured to obtain a plurality of different environment variable values of the circuit model. The second obtaining subcircuit is configured to obtain a simulation relationship netlist of the relevant logic devices in the oscillator. The third obtaining subcircuit is configured to obtain delay time of each of the relevant logic devices in the oscillator under the plurality of different environment variable values according to the plurality of environment variable values and the simulation relationship netlist of the relevant logic devices in the oscillator, and input the delay time of each of the logic devices in the oscillator under the plurality of different environment variable values into the digital circuit model to perform a simulation test.

Of course, an arrangement mode of the first obtaining circuit 100 is not limited thereto. For example, the first obtaining circuit 100 may also include a first obtaining subcircuit and a fourth obtaining subcircuit. The first obtaining subcircuit may be configured to obtain a plurality of different environment variable values of the circuit model. The fourth obtaining subcircuit may be configured to calculate the delay time of each of the relevant logic devices in the oscillator according to the plurality of environment variable values and the relationship between the plurality of environment variable values and the delay time of each of the relevant logic devices, and input the delay time of each of the logic devices in the oscillator under the plurality of different environment variable values into the digital circuit model to perform a simulation test.

In one embodiment, the detection circuit 200 includes a detection subcircuit 210 and a calculation subcircuit 220.

The detection subcircuit 210 is configured to obtain number of oscillations of the oscillator within a preset time period.

The calculation subcircuit 220 is configured to calculate the frequencies of the oscillator according to the number of oscillations of the oscillator within the preset time period.

The preset time period may be set according to actual needs.

It is to be understood that the arrangement mode of the detection circuit 200 is not limited thereto. In some embodiments, the detection circuit 200 may also include a detection subcircuit configured to obtain oscillation time required for the oscillator to oscillate a preset number of oscillations, and a calculation subcircuit configured to calculate the frequencies of the output signal from the oscillator under the plurality of different environment variable values according to the oscillation time required for oscillate the preset number of oscillations. The preset number of oscillations may be set according to actual needs. In some embodiments, the preset number of oscillations may be more (i.e., more than one) or one, which is not limited here.

In one embodiment, the plurality of environment variables include environment temperature.

The apparatus for analog simulation of a circuit model also includes a model establishment circuit 400.

The model establishment circuit 400 is configured to establish a digital simulation model according to the relationship between the environment temperature values and the frequencies of the oscillator.

In one embodiment, the circuit model also includes a simulation circuit model. The simulation circuit model includes a temperature sensor, which is configured to detect the environment temperature of the circuit model.

The apparatus for analog simulation of a circuit model also includes a second obtaining circuit 500.

The second obtaining circuit 500 is configured to obtain a temperature value of the temperature sensor, and input the temperature value of the temperature sensor into the digital simulation model, such that the digital simulation model outputs a corresponding digital signal value.

In one embodiment, the apparatus for analog simulation of a circuit model also includes an adjustment circuit 600. The adjustment circuit 600 is configured to adjust the environment temperature of the circuit model according to the corresponding digital signal value outputted by the digital simulation model.

In one embodiment, the plurality of environment variables are control voltages of the logic devices. In this case, an arrangement mode of the apparatus for analog simulation of a circuit model may be similar to the arrangement mode when the plurality of environment variables are the environment temperatures of the circuit model. For example, the apparatus for analog simulation of a circuit model may also be provided with a model establishment circuit. The model establishment circuit is configured to establish another digital simulation model according to the relationship between the control voltages of the logic devices and the frequencies of the oscillator.

Reference may be made to the limitation of the above method for analog simulation of a circuit model for the limitation of the apparatus for analog simulation of a circuit model, which will not be repeated here. Each circuit in the above apparatus for analog simulation of a circuit model may be implemented in whole or in part by software, hardware and combination thereof. Each of the above circuits may be embedded in the form of hardware or independent of a processor in a computer device, or may be stored in a memory of the computer device in the form of software, such that the processor may be invoked to execute the operations corresponding to each of the above-mentioned circuits. It is to be noted that the division of the circuits in the embodiments of the present disclosure is illustrative, which is merely a logical function division, and there may be other manners of division in actual implementations.

In one embodiment, there is provided a computer device including a memory and a processor, wherein the memory stores a computer program, and the computer program is executable by the processor, whereby the following steps are implemented.

Step S100: obtaining a plurality of different environment variable values of the circuit model;

Step S300: obtaining delay time of relevant logic devices in the oscillator under the plurality of different environment variable values according to the plurality of environment variable values;

Step S400: inputting the delay time of each of the logic devices in the oscillator under the plurality of different environment variable values into the digital circuit model to perform a simulation test;

Step S500: obtaining frequencies of an output signal from the oscillator under the plurality of different environment variable values; and Step S600: obtaining a relationship between the plurality of environment variable values and the frequencies of the output signal from the oscillator according to the frequencies of the output signal from the oscillator under the plurality of different environment variable values, to digitize the plurality of environment variable values.

In one embodiment, there is provided a computer-readable storage medium storing a computer program thereon, wherein the computer program is executable by a processor, whereby the following steps are implemented.

Step S100: obtaining a plurality of different environment variable values of the circuit model;

Step S300: obtaining delay time of each of the logic devices in the oscillator under the plurality of different environment variable values according to the plurality of environment variable values;

Step S400: inputting the delay time of each of the logic devices in the oscillator under the plurality of different environment variable values into the digital circuit model to perform a simulation test;

Step S500: obtaining frequencies of an output signal from the oscillator under the plurality of different environment variable values; and Step S600: obtaining a relationship between the plurality of environment variable values and the frequencies of the output signal from the oscillator according to the frequencies of the output signal from the oscillator under the plurality of different environment variable values, to digitize the plurality of environment variable values.

Those of ordinary skill in the art may understand that implementation of all or some flows in the method according to the foregoing embodiments may be achieved by instructing relevant hardware by a computer program, wherein the computer program may be stored in a non-transitory computer-readable storage medium, and when the computer program is executed, the flows of the embodiments of the foregoing methods may be included. Any reference to memory, storage, database or other media used in the embodiments provided in the present disclosure may include at least one of nonvolatile memory and/or volatile memory. The nonvolatile memory may include read-only memory (ROM), magnetic tape, floppy disk, flash memory, or optical memory, and the like. The volatile memory may include random access memory (RAM) or external cache memory. As an illustration and not as a limitation, the RAM may be in various forms, such as static random access memory (SRAM) or dynamic random access memory (DRAM), etc.

In the description of this specification, reference to the description of the terms “some embodiments”, “other embodiments”, “ideal embodiments”, etc. means that a particular feature, structure, material or feature described in connection with the embodiments or examples is included in at least one embodiment or example of the present disclosure. The schematic description of the above terms throughout this specification are not necessarily referring to the same embodiment or example.

Technical features of the above embodiments may be arbitrarily combined.

For simplicity, all possible combinations of the technical features in the above embodiments are not described. However, as long as the combination of these technical features is not contradictory, it shall be deemed to be within the scope recorded in this specification.

The above embodiments merely express a plurality of implementations of the present disclosure, and descriptions thereof are relatively concrete and detailed. However, these embodiments are not thus construed as limiting the patent scope of the present disclosure. It is to be pointed out that for persons of ordinary skill in the art, some modifications and improvements may be made under the premise of not departing from a conception of the present disclosure, which shall be regarded as falling within the scope of protection of the present disclosure. Thus, the scope of protection of the present disclosure shall be merely limited by the appended claims.

What is claimed is:

1. A computer-implemented method for analog simulation of a circuit model during a design phase of the circuit model, the circuit model comprising a digital circuit model, the digital circuit model comprising an oscillator, the oscillator comprising logic devices, and the method comprising:

obtaining a plurality of different environment variable values of the circuit model;

based on a plurality of environment variable values, determining delay time of a relevant logic device in the oscillator under the plurality of different environment variable values; the relevant logic device being a logic device whose delay time is affected by the plurality of environment variable values;

inputting the delay time of each of the logic devices in the oscillator under the plurality of different environment variable values as a simulation parameter into the digital circuit model to perform a simulation test on a computer;

obtaining, from a result of the simulation test, frequencies of an output signal from the oscillator under the plurality of different environment variable values; and obtaining a relationship between the plurality of environment variable values and the frequencies of the output signal from the oscillator according to the frequencies of the output signal from the oscillator under the plurality of different environment variable values, to digitize the plurality of environment variable values for subsequent digital simulation.

2. The computer-implemented method for analog simulation of a circuit model according to claim 1, wherein before determining delay time of each of the logic devices in the oscillator under the plurality of different environment variable values according to the plurality of environment variable values, the method further comprises:

obtaining a simulation relationship netlist of the relevant logic devices in the oscillator, the simulation relationship netlist comprising a plurality of environment variable values and a plurality of corresponding delay times.

3. The computer-implemented method for analog simulation of a circuit model according to claim 1, wherein the obtaining frequencies of the output signal from the oscillator under the plurality of different environment variable values comprises:

obtaining number of oscillations of the oscillator within a preset time period under the plurality of different environment variable values; and calculating the frequencies of the output signal from the oscillator under the plurality of different environment variable values according to the number of oscillations of the oscillator within the preset time period.

4. The computer-implemented method for analog simulation of a circuit model according to claim 1, wherein the plurality of environment variable values comprise an environment temperature, after obtaining a relationship between the plurality of environment variable values and the frequencies of the output signal from the oscillator according to the frequencies of the output signal from the oscillator under the plurality of different environment variable values, the method further comprises:

establishing a digital simulation model according to the relationship between the environment temperature values and the frequencies of the oscillator.

5. The computer-implemented method for analog simulation of a circuit model according to claim 4, wherein the circuit model further comprises a simulation circuit model, the simulation circuit model comprising a temperature sensor;

wherein after establishing the digital simulation model according to the relationship between the environment temperature values and the frequencies of the oscillator, the method further comprises:

obtaining a temperature value of the temperature sensor; and inputting the temperature value of the temperature sensor into the digital simulation model, such that the digital simulation model outputs a corresponding digital signal value.

6. The computer-implemented method for analog simulation of a circuit model according to claim 5, wherein after inputting the temperature value of the temperature sensor into the digital simulation model, such that the digital simulation model outputs a corresponding digital signal value, the method further comprises:

adjusting the temperature of the circuit model according to the corresponding digital signal value outputted by the digital simulation model.

7. The computer-implemented method for analog simulation of a circuit model according to claim 1, wherein the logic device comprises at least one of an inverter, a NAND gate or a NOR gate.

8. The computer-implemented method for analog simulation of a circuit model according to claim 1, wherein the plurality of environment variables comprise a control voltage of the logic device.

9. An apparatus for analog simulation of a circuit model during a design phase of the circuit model, the circuit model comprising a digital circuit model, the digital circuit model comprising an oscillator, the oscillator comprising logic devices, and the apparatus comprising:

a first obtaining circuit configured to obtain a plurality of different environment variable values of the circuit model, and based on the plurality of environment variable values, determine delay time of each of the logic devices in the oscillator under the plurality of different environment variable values; and input the delay time of each of the logic devices in the oscillator under the plurality of different environment variable values as a simulation parameter into the digital circuit model to perform a simulation test on a computer;

a detection circuit configured to obtain, from a result of the simulation test, frequencies of an output signal from the oscillator under the plurality of different environment variable values; and an analysis circuit configured to obtain a relationship between the plurality of environment variable values and the frequencies of the output signal from the oscillator according to the frequencies of the output signal from the oscillator under the plurality of different environment variable values, to digitize the plurality of environment variable values for subsequent digital simulation.

10. The apparatus for analog simulation of a circuit model according to claim 9, wherein the first obtaining circuit is further configured to obtain a simulation relationship netlist of the logic devices in the oscillator, the simulation relationship netlist comprising a plurality of environment variable values and a plurality of corresponding delay times.

11. The apparatus for analog simulation of a circuit model according to claim 9, wherein the detection circuit comprises:

a detection subcircuit configured to obtain number of oscillations of the oscillator within a preset time period; and a calculation subcircuit configured to calculate the frequencies of the oscillator according to the number of oscillations of the oscillator within the preset time period.

12. The apparatus for analog simulation of a circuit model according to claim 9, wherein the plurality of environment variable values comprise an environment temperature, the apparatus further comprising:

a model establishment circuit configured to establish a digital simulation model according to the relationship between the environment temperature values and the frequencies of the oscillator.

13. The apparatus for analog simulation of a circuit model according to claim 12, wherein the circuit model further comprises a simulation circuit model, the simulation circuit model comprising a temperature sensor;

the apparatus further comprising:

a second obtaining circuit configured to obtain a temperature value of the temperature sensor, and input the temperature value of the temperature sensor into the digital simulation model, such that the digital simulation model outputs a corresponding digital signal value.

14. The apparatus for analog simulation of a circuit model according to claim 13, wherein the apparatus further comprises:

an adjustment circuit configured to adjust the environment temperature of the circuit model according to the corresponding digital signal value outputted by the digital simulation model.

15. A computer device comprising a memory and a processor, the memory storing a computer program executable by the processor to implement the method according to claim 1.

16. A non-transitory computer-readable storage medium storing a computer program thereon, the computer program is executable by a processor to implement the method according to claim 1.

* * * * *